United States Patent [19]
Lin et al.

[11] Patent Number: 5,119,003
[45] Date of Patent: Jun. 2, 1992

[54] NON-LINEAR DYNAMIC COMPENSATION SYSTEM

[75] Inventors: Yu-Hwan Lin, Arcadia; Boris J. Lurie, La Crescenta, both of Calif.

[73] Assignee: California Institute of Technology, Pasadena, Calif.

[21] Appl. No.: 598,902

[22] Filed: Oct. 10, 1990

[51] Int. Cl.$^5$ ............................................. G05B 13/00
[52] U.S. Cl. ................................. 318/561; 318/632; 318/626; 318/620; 318/611
[58] Field of Search ............... 318/561, 632, 626, 620, 318/611

[56] References Cited

U.S. PATENT DOCUMENTS 4,338,659  7/1982  Kurakake ........................... 318/561
4,801,857  1/1989  Bundy ................................ 318/626

Primary Examiner—William M. Shoop, Jr.
Assistant Examiner—Saul M. Bergmann
Attorney, Agent, or Firm—Norman E. Brunell

[57] ABSTRACT

A non-linear dynamic compensation subsystem is added in the feedback loop of a high precision optical mirror positioning control system to smoothly alter the control system response bandwidth from a relatively wide response bandwidth optimized for speed of control system response to a bandwidth sufficiently narrow to reduce position errors resulting from the quantization noise inherent in the inductosyn used to measure mirror position. The non-linear dynamic compensation system includes a limiter for limiting the error signal within preselected limits, a compensator for modifying the limiter output to achieve the reduced bandwidth response, and an adder for combining the modified error signal with the difference between the limited and unlimited error signals. The adder output is applied to control system motor so that the system response is optimized for accuracy when the error signal is within the preselected limits, optimized for speed of response when the error signal is substantially beyond the preselected limits and smoothly varied therebetween as the error signal approaches the preselected limits.

6 Claims, 1 Drawing Sheet 5,119,003

NON-LINEAR DYNAMIC COMPENSATION SYSTEM

ORIGIN OF THE INVENTION

The invention described herein was made in the performance of work under a NASA contract, and is subject to the provisions of Public Law 96-517 (35 USC 202) in which the Contractor has elected to retain title.

FIELD OF THE INVENTION

1. Field of the Invention

The present invention relates to control systems and in particular to high precision positioning control systems using digital position sensors, such as those used for pointing optical mirrors.

2. Description of the Prior Art

Conventional high precision pointing control systems utilize feedback control systems with digital position sensors in which the error signal bandwidth is fixed at a value selected as a compromise between fast response and accurate positioning. High precision pointing systems of this type are limited in accuracy by the noise inherent in the quantization noise of the digital sensors. The desired control law is implemented by introducing, in the feedback loop, a linear or nonlinear compensator.

Such compensator are commonly linear and time invariant. Non-linear dynamic compensation systems are, however, frequently used for improving transient responses and for providing global stability as described in the book written by Boris Lurie, one of the inventors hereof entitled "FEEDBACK MAXIMIZATION" and published in 1986 by Artech House, Dedham, Mass.

What is needed is a high precision pointing control system which can minimize response time and positioning error, beyond the limits imposed by the digitization noise of the digital position sensing system, such as the control system of the present invention.

SUMMARY OF THE INVENTION

The preceding and other shortcomings of the prior art are addressed and overcome by the present invention that provides, in a first aspect, a control system including a device to be controlled, means for digitally determining a controllable condition of the device, means for generating an error signal related to the difference between the digitally determined controllable condition and a desired value of the controllable condition, means for controlling the device to achieve the desired value of the controllable condition, and non-linear dynamic compensation means for reducing limitations in system response due to quantization noise in the digital determination of the controllable condition by modifying the error signal in response to the magnitude thereof before application to the controlling means to alter the response of the control system from a first characteristic response in which the control system is optimized for speed of response to the error signal to a second characteristic response in which the control system is optimized for accuracy of achieving the desired condition.

In another aspect, the invention provides a method for modifying the response of a control system by digitally determining a controllable condition, generating an error signal related to the difference between the digitally determined controllable condition and a desired value of the controllable condition, and modifying the error signal smoothly in response to the magnitude thereof before application to control the condition to alter the response of the control system from a first characteristic response in which the control system is optimized for speed of response to the error signal to a second characteristic response in which the control system is optimized for accuracy of achieving the desired condition in order to reduce limitations in system response due to quantization noise in the digital determination of the controllable condition.

The foregoing and additional features and advantages of this invention will become further apparent from the detailed description and accompanying drawing figure or figures that follow. In the figures and written description, numerals indicate the various features of the invention, like numerals referring to like features throughout both the drawing figures and the written description.

DETAILED DESCRIPTION OF THE PREFERRED EMBODIMENT

Figure 1:
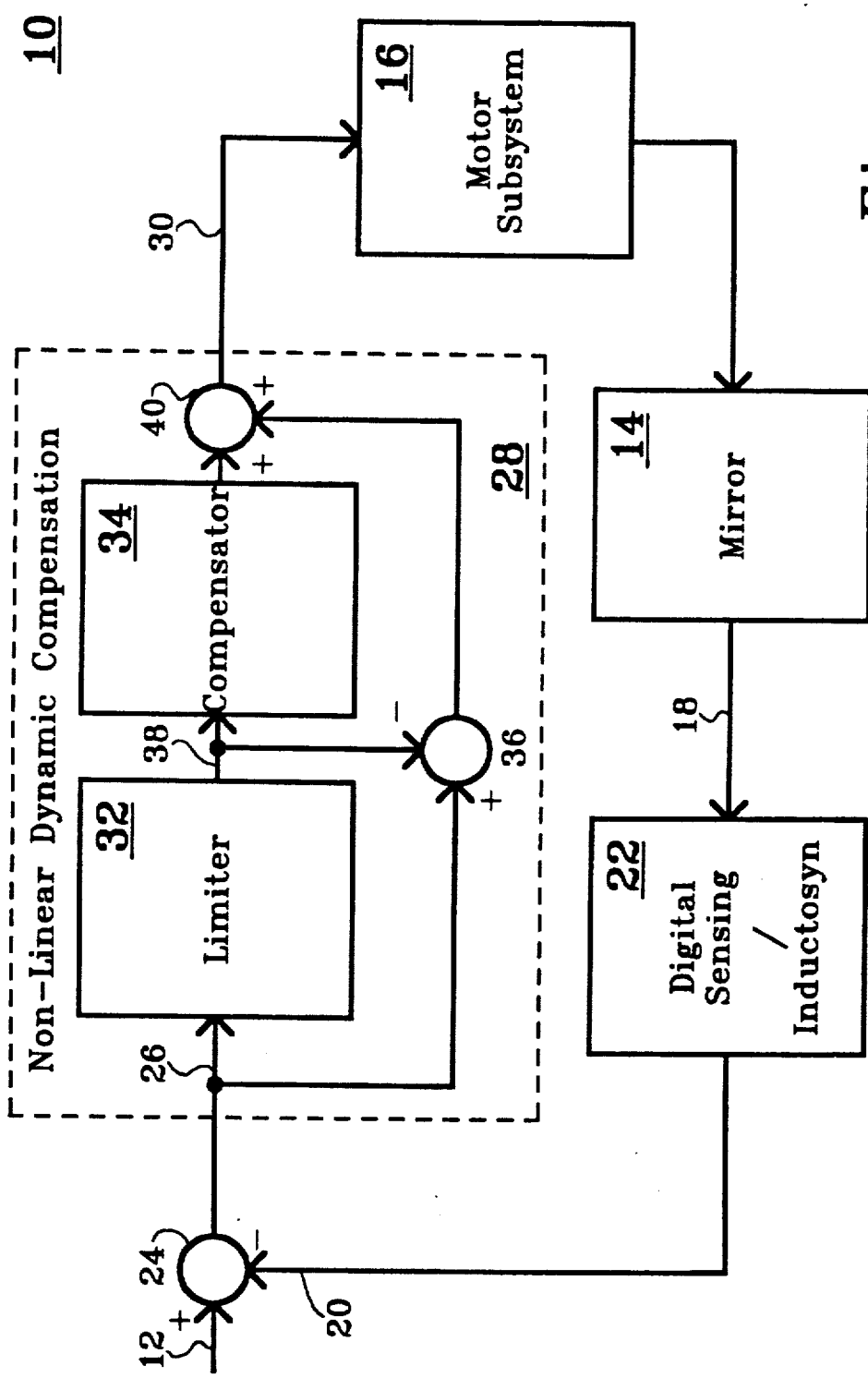
FIG. 1 is a block diagram of a pointing control system according to the present invention.

FIG. 1 is a block diagram of pointing control system 10 according to the present invention which operates in response to command input angle 12 to position a pointing device, such as optical mirror 14, in response to a conventional positioning device, such as motor subsystem 16 which includes both a motor and linear feedback compensation for the motor. The actual angular position of mirror 14, shown in the Figure as angle 18, is converted to an electrical signal, such as measured angle 20, by a digital sensing device such as inductosyn 22. It is the system limitations resulting from the digitization noise inherent in the determination of measured angle 20 by inductosyn 22 to which the present invention is addressed.

Measured angle 20 is compared with command input angle 12 in subtractor 24 to determine feedback error signal 26. In a conventional pointing control system, feedback error signal 26 would be applied directly as an input to motor subsystem 16 which would then position mirror 14 as accurately as possible. Motor subsystem 16 may be designed so that the bandwidth of the response of motor subsystem 16 and mirror 14 would maximize the speed of response for positioning optical mirror 14.

When measured angle 20 becomes equal to command input angle 12, feedback error signal 26 is zero and motor subsystem 16 would not make any further changes in the position of optical mirror 14.

In a particular implementation of the above described positioning system, the bandwidth of motor subsystem 16 was chosen to be 7 Hz for maximum speed of response for positioning of a particular optical mirror 14. However, at very small values for feedback error signal 26, the positioning accuracy of pointing control system 10 was found to be limited by the quantization noise inherent in inductosyn 22. Reducing the effective bandwidth of motor subsystem 16 from 7 Hz to about 2 Hz maximized the positioning accuracy but, predictably, degraded the speed of system response.

In accordance with the present invention, non-linear dynamic compensation subsystem 28 may be inserted between subtractor 24 and motor subsystem 16 to modify feed back error signal 26 as compensated feedback error signal 30 before application to motor subsystem 16

Non-linear dynamic compensation subsystem 28 includes limiter 32, compensator 34 and subtractor 36.

During operation of non-linear dynamic compensation subsystem 28, feedback error signal 26 is applied to limiter 32 and one input of subtractor 36. Limiter 32 serves to limit feedback error signal 26 within preselected limits to generate limited error signal 38. In the particular implementation discussed above, the preselected limits chosen were ±7 μradians.

Limited error signal 38 is applied to subtractor 36 and compensator 34. Subtractor 36 serves to compare feedback error signal 26 and limited error signal 38. The output of subtractor 36 is combined with the output of compensator 34 in adder 40, the output of which is compensated feedback error signal 30 which is then applied to the input of motor subsystem 16.

The operation of non-linear dynamic compensation subsystem 28 differs depending upon the magnitude of feedback error signal 26 with respect to the present limits of limiter 32, as will be described next. If, for example, feedback error signal 26 substantially exceeds the preset limits of limiter 32, limited error signal 38 will be substantially smaller than feedback error signal 26 as a result of the operation of limiter 32.

Subtractor 36 then serves to subtract limited error signal 38 from substantially larger feedback error signal 26. The output of subtractor 36 will therefore be almost as large as feedback error signal 26.

Limited error signal 38 is applied to compensator 34 and modified by the signal transform characteristics selected for compensator 34. The output of compensator 34 is then added to the output of subtractor 36 before it is applied as compensated feedback error signal 30 to motor subsystem 16. If feedback error signal 26 is sufficiently larger than the preset limits of limiter 32, compensated feedback error signal 30 will consist primarily of the output of subtractor 36, that is, feedback error signal 26.

In this case, in which feedback error signal 26 greatly exceeds the limits of limiter 32, non-linear dynamic compensation subsystem 28 has no significant effect on feedback error signal 26 so that it is applied, relatively unchanged, to motor subsystem 16. In the implementation discussed above, the bandwidth of motor subsystem 16 for driving optical mirror 14 was optimized for speed of response. Pointing control system 10, for large values of feedback error signal 26, therefore operates in a manner optimized for speed of response, as desired.

On the other hand, if feedback error signal 26 is within the preset limits of limiter 32, feedback error signal 26 is not changed by limiter 32 so that limited error signal 38 is equal to feedback error signal 26. These signals are both applied to subtractor 36 whose output is therefore zero. Limited error signal 38 is then modified by the signal transformation function of compensator 34 and is applied to adder 40.

As noted above, however, the other input of adder 40, which is the output of subtractor 36, is zero. Limited error signal 38, which in this case is equal to non-linear dynamic compensation subsystem 28, is therefore applied directly to motor subsystem 16 as compensated feedback error signal 30.

Therefore, when feedback error signal 26 is within the preselected limits of limiter 32, it is modified by the transform inherent in compensator 34 before application to motor subsystem 16 as compensated feedback error signal 30. It is convenient to choose the signal transform function of compensator 34 so that when applied to feedback error signal 26 in the case being discussed, the resultant compensated feedback error signal 30 is maximized for positioning accuracy.

In the particular implementation discussed above, it was determined that a bandwidth of about 2 Hz was optimum for pointing accuracy. In this implementation, the transform function of compensator 34 would therefore be selected so that the effective bandwidth of the correction applied by motor subsystem 16 to optical mirror 14 would be limited to 2 Hz.

In this case, in which feedback error signal 26 is within the limits of limiter 32, non-linear dynamic compensation subsystem 28 has the primary significant effect on compensated feedback error signal 30 so that what is applied to motor subsystem 16 is primarily feedback error signal 26 modified by the transform of compensator 34. As noted above, this transform was optimized for pointing accuracy. Pointing control system 10, for values of feedback error signal 26 within preselected limits, therefore operates in a manner optimized for accuracy as desired.

In the intermediate cases, in which feedback error signal 26 exceeds the preselected limits of limiter 32 by an amount small enough so that the outputs of compensator 34 and subtractor 36 are both significant portions of compensated feedback error signal 30, the effective bandwidth of pointing control system 10 is somewhere between the value optimized for speed of response and the value optimized for accuracy.

In other words, when feedback error signal 26 is very large, the pointing system moves the optical mirror quickly. As the error is reduced, the speed of response is reduced as the effective bandwidth smoothly changes toward the optimum value for positioning accuracy. When the error is reduced to within the preselected limits, the speed of response is not optimized, but the accuracy of positioning has been optimized by reducing the bandwidth of the feedback control system to reduce effects of the quantization noise of the analog to digital transformation performed by inductosyn 22.

While this invention has been described with reference to its presently preferred embodiments, its scope is not limited thereto. Rather, such scope is only limited in so far as defined by the following set of claims and includes all equivalents thereof.

What is claimed is:

1. A servo system for controlling an output device in response to a command signal to attain a desired value of a variable represented by the command signal, comprising:

means for digitally determining the value of the variable;

means responsive to said digitally determined value for developing a feedback error signal representing the deviation of said value from the command signal, said feedback error signal being optimized for speed of response of said output device to changes in said value;

limiter means for developing a limited error signal by limiting the magnitude of said error signal to a predetermined value;

compensator means responsive to said limited error signal for developing a modified error signal optimized for accuracy in controlling said output device to achieve the desired value of the variable; and means responsive to said feedback error, limited error, and modified error signals for developing a compensated error signal therefrom and for applying said compensated error signal to the output device so that the output device is controlled substantially by said feedback error signal when the magnitude thereof is substantially greater than said predetermined value, controlled substantially by said modified error signal when said feedback error signal is substantially less than said predetermined value and controlled by a smoothly varying combination thereof when the magnitude of said feedback error signal is near the predetermined value.

2. The system of claim 1 wherein said compensated error signal varies between said feedback error and said modified error signals as a function of the magnitude of said feedback error signal.

3. The system of claim 2, wherein said means for developing said compensated error signal further comprises:

subtractor means for subtracting said limited error signal from said feedback error signal; and adder means responsive to said subtractor means for combining the output thereof with said modified error signal to develop said compensated error signal.

4. A method of reducing quantization noise effects in a servo system for controlling an output device in response to a command signal to attain a desired value of a variable represented by the command signal, comprising the steps of:

digitally determining the value of the variable;

developing a feedback error signal representing the deviation of said command signal from said digitally determined value, said feedback error signal being optimized for speed of response of said output device to changes said value;

limiting the magnitude of said error signal to a predetermined value to develop a limited error signal;

developing a modified error signal from said limited error signal, said modified error signal being optimized for accuracy in achieving the desired value of the variable;

controlling said output device substantially by said feedback error signal when the magnitude thereof si substantially greater than said predetermined value;

controlling said output device substantially by said modified error signal when said feedback error signal is substantially less than said predetermined value; and controlling said output device by a combination thereof which smoothly varies as a function of the magnitude of said feedback error signal when the magnitude thereof is near the predetermined value.

5. The method of claim 4, further comprising the steps of:

developing a compensated error signal by combining said feedback error signal and said modified error signal; and applying said compensated error signal to said output device.

6. The method of claim 5 wherein said step of developing said compensated error signal further comprises the steps of:

subtracting said limited error signal from said feedback error signal; and adding the result of said subtraction to said modified error signal to develop said compensated error signal.

* * * * *

UNITED STATES PATENT AND TRADEMARK OFFICE
CERTIFICATE OF CORRECTION

PATENT NO. : 5,119,003
DATED : Jun. 02, 1992
INVENTOR(S) : Yu-Hwan Lin; Boris J. Lurie It is certified that error appears in the above-identified patent and that said Letters Patent is hereby corrected as shown below:

COL. 1    LINE 11    Replace --FIELD-- with "BACKGROUND";

COL. 2    LINE 68    Insert "." after --16--;

COL. 6    LINE 11    Replace --si-- with "is".

Signed and Sealed this

Thirty-first Day of August, 1993

Attest:

BRUCE LEHMAN

*Attesting Officer*    Commissioner of Patents and Trademarks